US010845628B2

(12) United States Patent
Cermak et al.

(10) Patent No.: US 10,845,628 B2
(45) Date of Patent: Nov. 24, 2020

(54) SYSTEM AND METHOD TO DIM AT LEAST A PORTION OF A VEHICLE WINDOW

(71) Applicant: GENERAL MOTORS LLC, Detroit, MI (US)

(72) Inventors: Alexander X. Cermak, Grosse Pointe Woods, MI (US); Ryan Olejniczak, Clinton Township, MI (US); Dexter C. Lowe, Macomb, MI (US); Esteban Camacho, Belleville, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 179 days.

(21) Appl. No.: 16/185,107

(22) Filed: Nov. 9, 2018

(65) Prior Publication Data

US 2020/0150462 A1  May 14, 2020

(51) Int. Cl.
*G02F 1/015* (2006.01)
*G05B 19/042* (2006.01)
(Continued)

(52) U.S. Cl.
CPC ............... *G02F 1/015* (2013.01); *B60J 3/04* (2013.01); *B60R 11/04* (2013.01); *G02F 1/0121* (2013.01);
(Continued)

(58) Field of Classification Search
CPC . G02F 1/157; G02F 1/01; G02F 1/155; G02F 2203/10; G02F 1/0121; G02F 1/015; G02F 1/161; G02F 1/163; G02F 2001/0157; G02F 1/0018; G02F 1/025; G02F 2202/32; G02F 2203/15; G02F 1/0102; G02F 1/011; G02F 1/017; G02F 1/1334; G02F 1/1533; G02F 2202/10; G02F 1/0126; B60R 1/088; B60R 1/12; B60R 1/04; B60R 1/084; B60R 2001/1215; B60R 2001/1223; B60R 11/02; B60R 11/0235; B60R 1/02; B60R 1/086; B60R 1/1207; B60R 2011/0033; H01S 5/0265;
(Continued)

(56) References Cited

U.S. PATENT DOCUMENTS 8,363,301 B2    1/2013  Lee
2010/0149223 A1  6/2010  Betts-LaCroix
(Continued)

FOREIGN PATENT DOCUMENTS

EP    3352053 A1    7/2018

OTHER PUBLICATIONS

German Office Action for application No. 10 2019 116 167.3 dated Feb. 20, 2020, 5 pages.
(Continued)

*Primary Examiner* — William R Alexander
*Assistant Examiner* — Sharrief I Broome

(57) ABSTRACT

One general aspect includes a system to tint at least a portion of a vehicle window, the system including: a memory configured to include one or more executable instructions and a processor configured to execute the executable instructions, where the executable instructions enable the processor to: monitor ambient light in a surrounding vehicle environment; and based on the ambient light, dim at least a portion of an OLED window located at a vehicle.

17 Claims, 7 Drawing Sheets

(51) Int. Cl.
  *B60J 3/04* (2006.01)
  *B60R 11/04* (2006.01)
  *G02F 1/01* (2006.01)
  *G06F 3/01* (2006.01)
  *G06F 3/041* (2006.01)
  *G06K 9/00* (2006.01)
  *G06T 7/73* (2017.01)

(52) U.S. Cl.
  CPC ......... *G05B 19/0428* (2013.01); *G06F 3/013* (2013.01); *G02F 2001/0155* (2013.01); *G05B 2219/23069* (2013.01); *G06F 3/041* (2013.01); *G06K 9/00255* (2013.01); *G06T 7/73* (2017.01)

(58) Field of Classification Search
  CPC ............. H01S 2301/176; H01S 3/0064; H01S 3/2316; H01S 5/04257; H01S 5/12; H01S 5/18302; H01S 5/18341; H01S 5/18394; H01S 5/50; H01S 2301/02; H01S 3/0085; H01S 3/0092; H01S 3/025; H01S 3/0315; H01S 3/04; H01S 3/0627; H01S 3/063; H01S 3/09415; H01S 3/09702; G02B 26/02; G02B 5/0808; G02B 6/1225; G02B 1/002; G02B 2006/12142; G02B 26/001; G02B 30/25; G02B 30/27; G02B 5/008; G02B 5/04; G02B 6/0053; G02B 6/12004; G02B 6/12007; G02B 1/005; G02B 1/08; G02B 1/113; G02B 1/18; G02B 2006/12078; G02B 2006/12152; G02B 2027/011; B32B 17/10; B32B 17/10036; B32B 17/10532; B32B 17/10761; B32B 17/10788; B32B 2367/00; B32B 17/10119; B32B 17/10229; B32B 17/10302; B32B 17/10348; B32B 17/10504; B32B 17/10513; B32B 17/10669; B32B 17/1077; B32B 17/1099; B32B 2307/202; B32B 2307/412; B32B 2310/0843; B32B 2457/20; B32B 37/12; G09G 3/19; G09G 2300/026; G09G 2300/0426; G09G 2300/08; G09G 2300/0809; G09G 2300/0847; G09G 2310/0245; G09G 2310/0254; G09G 2310/0256; G09G 2310/0262; G09G 2310/027; G09G 2310/066; G09G 2320/0233; G09G 2320/0238; G09G 2320/0252; G09G 2320/0626; G09G 2320/0686; G09G 2340/0492; G09G 2360/145; G09G 3/003
  See application file for complete search history.

(56) References Cited

U.S. PATENT DOCUMENTS

| | | |
|---|---|---|
| 2012/0303214 A1 | 11/2012 | Yuter |
| 2014/0176469 A1 | 6/2014 | Lim |
| 2015/0261219 A1* | 9/2015 | Cuddihy ............... B60J 1/2016 701/23 |
| 2015/0294169 A1* | 10/2015 | Zhou ...................... G06F 3/013 348/148 |
| 2016/0148062 A1* | 5/2016 | Fursich ................ H04N 13/239 348/36 |
| 2017/0153457 A1* | 6/2017 | Kunze .................. H04N 13/322 |
| 2017/0349099 A1* | 12/2017 | Kunze ................ G02B 27/0101 |
| 2018/0111451 A1* | 4/2018 | Martens .................... B60J 3/04 |
| 2018/0128044 A1* | 5/2018 | Ochiai ................... G02F 1/137 |

OTHER PUBLICATIONS

Jaimin Patel, How Do Automatic Headlights Work?, Oct. 31, 2016, https://www.quora.com/How-do-automatic-headlights-work, United States.

What is a light sensor? Does my vehicle have a windshield sensor?, website (retrieved on Nov. 8, 2018), https://www.safelite.com/windshield-auto-glass-technology/headlight-sensors.

Kelsey Mays, How Cadillac's Super Cruise System Works, Apr. 24, 2017, https://www.cars.com/articles/how-cadillacs-super-cruise-system-works-1420695204019/.

Bryn Farnsworth, PhD, 10 Most Used Eye Tracking Metrics and Terms, Aug. 14, 2018, https://imotions.com/blog/7-terms-metrics-eye-tracking/.

* cited by examiner

SYSTEM AND METHOD TO DIM AT LEAST A PORTION OF A VEHICLE WINDOW

INTRODUCTION

Driving on a sunny day can be very delightful. However, it can also produce driver distraction from sunlight and other light distractors. In some instances, for example, when the sun is at a certain location in the sky relative to the vehicle, the sunlight can be so strong that it is blinding and could potentially cause the vehicle operator to drive recklessly. Moreover, the sunlight can create heat in the vehicle cabin, which can be uncomfortable for the vehicle operator. It is therefore desirable to provide a system and method that will produce a tinted area on a vehicle windshield to actively dim sunlight and other light distractors so as to alleviate driver distraction and uncomfortableness. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to tint at least a portion of a vehicle window, the system including: a memory configured to include one or more executable instructions and a processor configured to execute the executable instructions, where the executable instructions enable the processor to: monitor ambient light in a surrounding vehicle environment; and based on the ambient light, dim at least a portion of an OLED window located at a vehicle. Other embodiments of this aspect include corresponding computer systems, apparatus, and computer programs recorded on one or more computer storage devices, each configured to perform the actions of the methods.

Implementations may include one or more of the following features. The system where the executable instructions further enable the processor to: in response to feedback provided by a vehicle occupant, adjust a visible light transmission (VLT) of the dimmed OLED window. The system where the executable instructions further enable the processor to: receive regulatory information from a third party; based on the regulatory information, establish a minimum VLT level for the OLED window; and where the OLED window cannot be dimmably adjusted to exceed the minimum VLT level. The system where the executable instructions further enable the processor to: in response to feedback provided by a vehicle occupant, adjust a color of the dimmed OLED window. The system where the vehicle window is a windshield. The system where the ambient light is monitored via a light sensor located at the vehicle. Implementations of the described techniques may include hardware, a method or process, or computer software on a computer-accessible medium.

One general aspect includes a system to tint at least a portion of a vehicle window, the system including: a memory configured to include one or more executable instructions and a processor configured to execute the executable instructions, where the executable instructions enable the processor to: monitor ambient light in a surrounding vehicle environment via a light sensor located on a vehicle; based on the ambient light, monitor one or more facial features of a vehicle occupant via a camera located on a steering column of the vehicle; based on an orientation of the one or more facial features, identify a point of gaze (POG) position along a surface of an organic light-emitting diode (OLED) window that corresponds to the orientation of the one or more facial features; and generate a dim spot relative to the POG position via the OLED window. Other embodiments of this aspect include corresponding computer systems, apparatus, and computer programs recorded on one or more computer storage devices, each configured to perform the actions of the methods.

Implementations may include one or more of the following features. The system where the executable instructions further enable the processor to: in response to feedback provided by the vehicle occupant, adjust a visible light transmission (VLT) of the dim spot. The vehicle where the vehicle occupant feedback is provided by a mobile computing device. The vehicle where the vehicle occupant feedback is provided by a touch screen display. The system where the executable instructions further enable the processor to: receive regulatory information from a third party; based on the regulatory information, establish a minimum VLT level for the dim spot; and where the VLT of the dim spot cannot be adjusted to exceed the minimum VLT level. The system where the executable instructions further enable the processor to: in response to feedback provided by the vehicle occupant, adjust a color of the dim spot. The system where the vehicle window is a windshield. Implementations of the described techniques may include hardware, a method or process, or computer software on a computer-accessible medium.

One general aspect includes a vehicle including: an organic light-emitting diode (OLED) window; a light sensor installed on a vehicle; a steering column including a camera; a cabin configured to hold at a vehicle occupant; a memory configured to include one or more executable instructions and a processor configured to execute the executable instructions, where the executable instructions enable the processor to: monitor ambient light in a surrounding vehicle environment via the light sensor; based on the ambient light, monitor one or more facial features of a vehicle occupant via the camera; based on an orientation of the one or more facial features, identify a point of gaze (POG) position along a surface of the OLED window that corresponds to the orientation of the one or more facial features; and generate a dim spot relative to the POG position via the OLED window. Other embodiments of this aspect include corresponding computer systems, apparatus, and computer programs recorded on one or more computer storage devices, each configured to perform the actions of the methods.

Implementations may include one or more of the following features. The vehicle where the executable instructions further enable the processor to: when an orientation of the one or more facial features is adjusted, adjust the POG position along the surface of the OLED window so as to correspond to the subsequent orientation of the one or more facial features; and provide the dim spot relative to the adjusted POG position via the OLED window. The vehicle where the executable instructions further enable the processor to: in response to feedback provided by the vehicle occupant, adjust a visible light transmission (VLT) of the dim spot. The vehicle where the vehicle occupant feedback is provided by a mobile computing device. The vehicle where the vehicle occupant feedback is provided by a touch screen display. The vehicle where the executable instructions further enable the processor to: receive regulatory information from a third party; based on the regulatory information, establish a minimum VLT level for the dim spot; and where the VLT of the dim spot cannot be adjusted to exceed the minimum VLT level. The vehicle where the executable instructions further enable the processor to: in response to feedback provided by the vehicle occupant, adjust a color of the dim spot. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
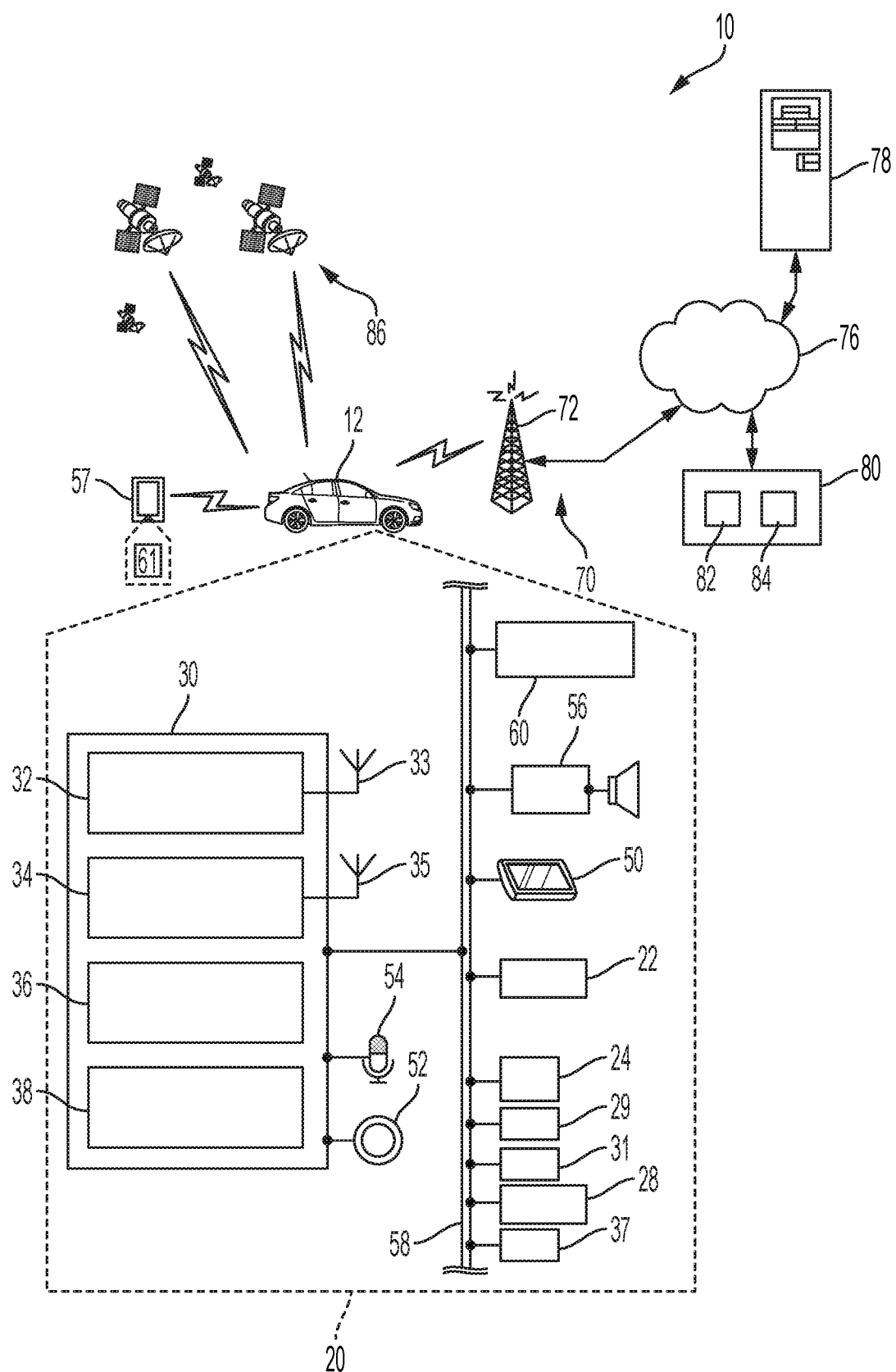
FIG. 1 is a functional block diagram of a vehicle that includes a communication system for controlling and implementing a system and method to tint at least a portion of a vehicle window in accordance with one or more exemplary embodiments discussed herein.

With reference to FIG. 1, there is shown an operating environment that comprises a communications system 10 and that can be used to implement the method disclosed herein. Communications system 10 generally includes a vehicle 12 that includes vehicle electronics 20, one or more wireless carrier systems 70, a land communications network 76, a computer or server 78, a vehicle backend services facility 80, and a constellation of global navigation satellite system (GNSS) satellites 86. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally, in FIG. 1 and includes a global navigation satellite system (GNSS) receiver 22, a body control module or unit (BCM) 24, other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSMs, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with wireless device 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state, based on one or more onboard vehicle sensor readings, as discussed more below.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the device 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80. And, in other embodiments, other protocols can be used for V2V or V2I communications. The SRWC circuitry 32 enables the telematics unit 30 to transmit and receive SRWC signals, such as BLE signals. The SRWC circuit can allow the device 30 to connect to another SRWC device. Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability and memory (not shown) and a transceiver capable of communicating with wireless carrier system 70. Examples of the mobile computing device 57 include the iPhone™ manufactured by Apple, Inc. and the Droid™ manufactured by Motorola, Inc. as well as others. Mobile device 57 may moreover be used inside or outside of vehicle 12, and may be coupled to the vehicle by wire or wirelessly. When using a SRWC protocol (e.g., Bluetooth/Bluetooth Low Energy or Wi-Fi), mobile computing device 57 and telematics unit 30 may pair/link one with another when within a wireless range (e.g., prior to experiencing a disconnection from the wireless network). In order to pair, mobile computing device 57 and telematics unit 30 may act in a BEACON or DISCOVERABLE MODE having a general identification (ID); SRWC pairing is known to skilled artisans. Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Data center 80 may also authorize SRWC on an individual basis before completion.

The mobile computing device 57 additionally has a vehicle-related software application 61 (e.g., RemoteLink™ by OnStar, myChevrolet™ by General Motors, etc.) resident on its memory. This vehicle app 61 may be downloaded (e.g., from an online application store or marketplace) and stored on the device's electronic memory. In the examples disclosed herein, the vehicle app 61 enables the mobile computing device user to provide feedback in response to one or more vehicle features. In particular, the vehicle app 61 enables the user to wirelessly adjust the visible light transmission (VLT) level of a dim spot produced on a windshield of the vehicle 12 (discussed below).

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, light sensor 29, an organic light-emitting diode (OLED) window 31, and camera 37. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. Various other vehicle-user interfaces can also be utilized, as the interfaces of FIG. 1 are only an example of one particular implementation.

Light sensor 29 may be a photodetector that can sense ambient light (luminescence) in the environment surrounding vehicle 12. In one or more embodiments, light sensor 29 is embedded in a rear-view mirror mounting module (not shown) that abuts the windshield of the vehicle 12. OLED window 31 is a smart, translucent window with OLED technology inserted such that a vehicle occupant (vehicle operator) can see video images produced on the pane of OLED window 31 in a similar way as they would view these images on a television or computer monitor. In one or more embodiments, OLED window 31 can be an OLED screen that is strong enough to be the windshield of vehicle 12, the driver-side or passenger-side front-row vehicle windows, the sunroof/moon roof of vehicle 12, or some other window. In one or more other embodiments, the OLED window 31 can be an OLED screen sandwiched between two panes of glass, in which the OLED screen and glass panes combine to form the windshield, the driver-side or passenger-side front-row vehicle windows, the sunroof/moon roof, or some other window of vehicle 12. Camera 37 can be installed on a steering column of vehicle 12 and can be positioned to capture video images of the vehicle occupant's facial features (e.g., the vehicle occupant's retinas). Camera 37 can be part of a generally known Driver Attention System (DAS), for example, as part of the SUPER CRUISE™ feature offered by certain vehicles manufactured by GENERAL MOTORS™. Camera 37 can also employ infrared lights or ultraviolet sensors (or both) to accurately track the positioning and orientation of the occupant's facial features.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases 84 at the remote facility 80 can store various information and can include a vehicle operation database that stores information regarding the operation of various vehicles (e.g., vehicle telemetry or sensor data). For example, the one or more databases 84 may incorporate regulatory information which includes the minimum allowable visible light transmission (VLT) percentage for each jurisdiction in the United States, as well as any other jurisdiction around the world. As such, if the minimum legal VLT in New York State is 70% (i.e., the tint must allow 70% of light into a vehicle), a vehicle window being tinted at a VLT of 60% would be in violation of New York State law. Also, the remote server 80 can receive can thus act to distribute software (and/or software updates) to the various vehicles including vehicle 12.

Method

Figure 2:
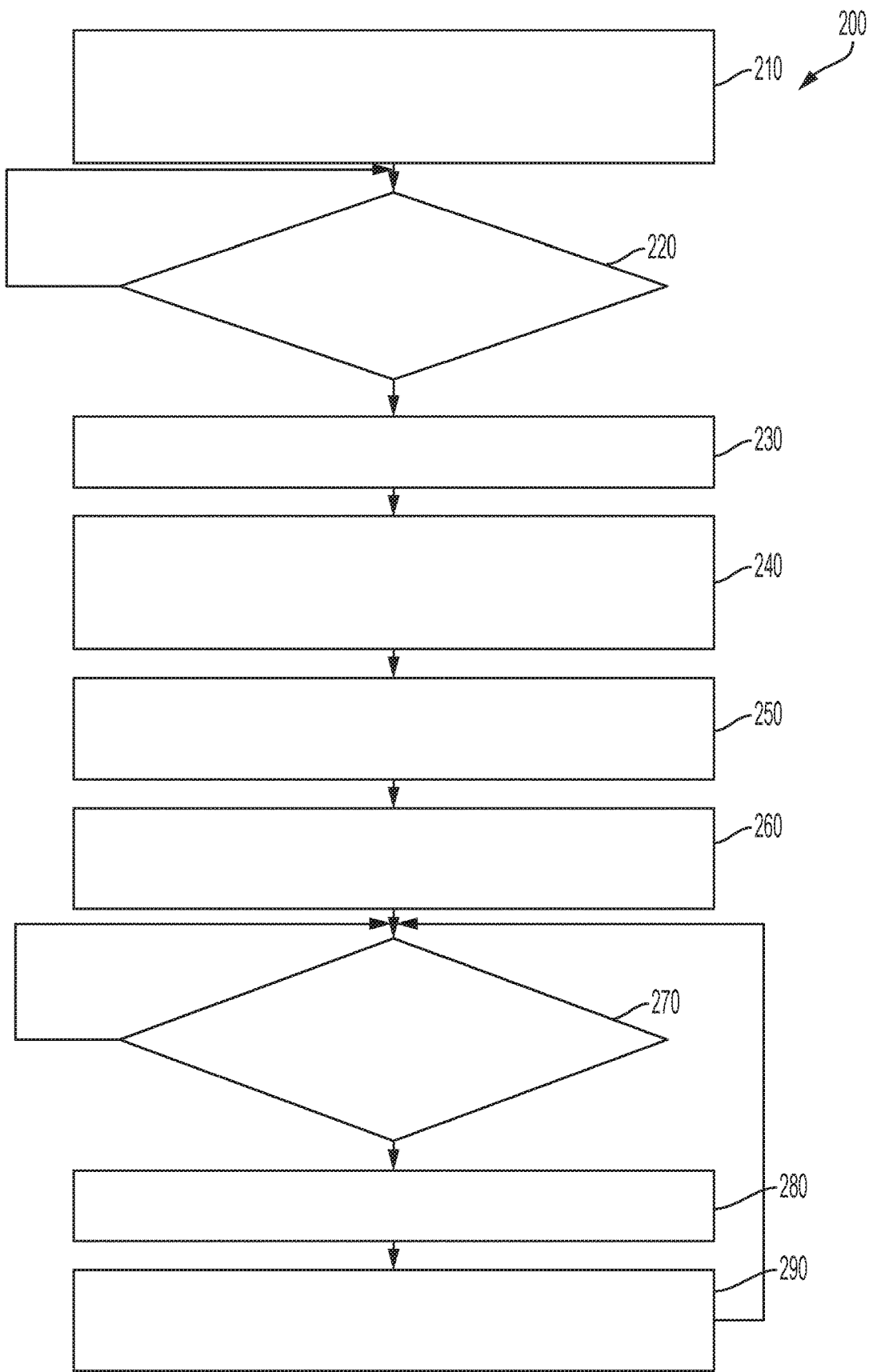
FIG. 2 is a flowchart of an exemplary process to dim at least a portion of a vehicle window.

Now turning to FIG. 2, there is shown an embodiment of a method 200 to generate a dim spot on a vehicle window in order to actively inhibit light distractors from being able to distract and/or temporarily blind a vehicle occupant (e.g., concentrated light from the sun, illuminated signs, and reflections off street signs as well as parts of other vehicles). One or more aspects of window tinting method 200 may be completed through vehicle telematics unit 30 which may include one or more executable instructions incorporated into memory device 38 and carried out by processor 36 (controller). One or more ancillary aspects of method 200 may otherwise, for example, be completed through light sensor 29, OLED window 31, and camera 37.

Method 200 is supported by telematics unit 30 being configured to establish one or more communication protocols with remote facility 80 and mobile computing device 57. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 38).

Figure 3:
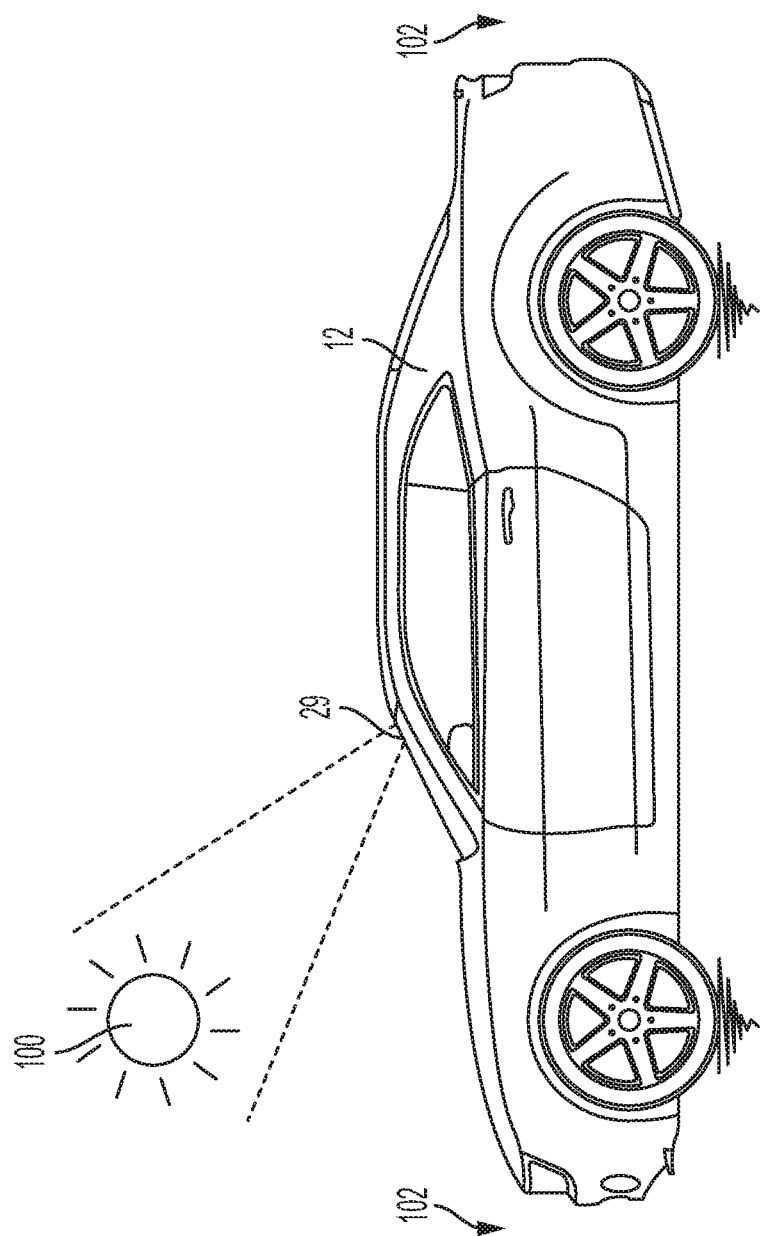
FIG. 3 depicts an application of an exemplary aspect of the process of FIG. 2 in accordance with one or more exemplary embodiments.

Method 200 begins with a vehicle occupant (e.g., vehicle operator) being located within a cabin of vehicle 12. Moreover, at the beginning of this methodology, the vehicle 12 is in an operational state (i.e., in the ON state). In step 210, with additional reference to FIG. 3, the light sensor 29 monitors the ambient light 100 in the vehicle environment 102 directly outside of vehicle 12 (i.e., the natural daylight around the vehicle, with or without the addition of artificial light). For example, the amount of ambient light 100 in the vehicle environment could be somewhere between 10,000-25,000 lux for full daylight, it could be somewhere between 32,000-100,00 lux for direct sunlight, or it could be less than 100 lux during the night. Moreover, in this step, light sensor 29 will provide the ambient light reading to processor 36.

In step 220, processor 36 will review the ambient light reading and compare this reading to a threshold value stored in memory device 38. For example, the threshold value may be 50,000 lux, which would indicate that sunlight is being shined directly onto at least the front half of vehicle 12 and would likely be distracting for the vehicle occupant. Moreover, in this step, processor 36 will determine if the ambient light reading exceeds the threshold value (e.g., 75,000 lux). If the ambient light reading exceeds this threshold value, method 200 will move step 230. If the ambient light reading does not exceed this threshold value, however, the processor 36 will return to monitoring the ambient light reading (at least until the reading exceeds the threshold value).

Figure 4:
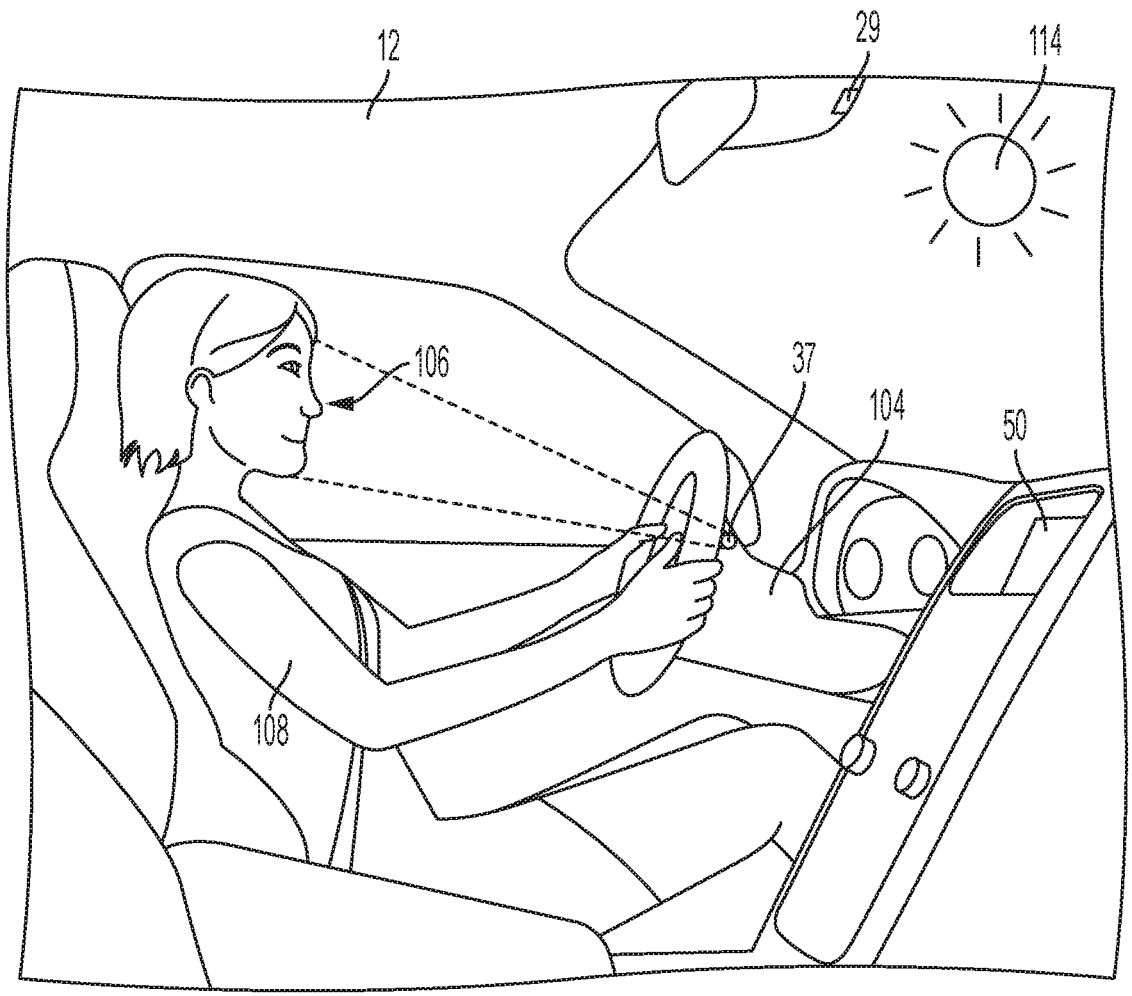
FIG. 4 depicts an application of another exemplary aspect of the process of FIG. 2 in accordance with one or more exemplary embodiments.

In step 230, with additional reference to FIG. 4, processor 36 will activate the camera 37 on steering column 104. Moreover, camera 37 will capture real-time video footage of the vehicle occupant's head and facial features 106 and provide this video footage to processor 36. In addition, in various embodiments, upon receiving this video footage, processor 36 will retrieve generally known facial recognition software (e.g., FACE ID™ by APPLE™, DEEPFACE™ by FACEBOOK™, WINDOWS HELLO™ by MICROSOFT™, etc.) from memory 38. Processor 36 will also apply this facial recognition software to the video footage to monitor the orientation and alignment of prominent landmarks on the vehicle occupant's face (e.g., eyebrows, eyes, nose, and mouth) so as to determine head movement and the occupant's point of gaze (i.e., the location in which they are looking, otherwise known as a line of sight). In various other embodiments, processor 36 will retrieve generally known retina tracking software (e.g., XLABS™, GAZEPOINTER™, MYEYE™, OGAMA™, ITU GAZETRACKER™, etc.) from memory 38 and apply this retina tracking software to the video footage to monitor the orientation of the vehicle occupant's retinas (i.e., one of their facial features 106) and determine the vehicle occupant's point of gaze as well as the motion of the occupant's eyes relative to their head (to detect adjustments to/changes in the point of gaze).

Figure 5:
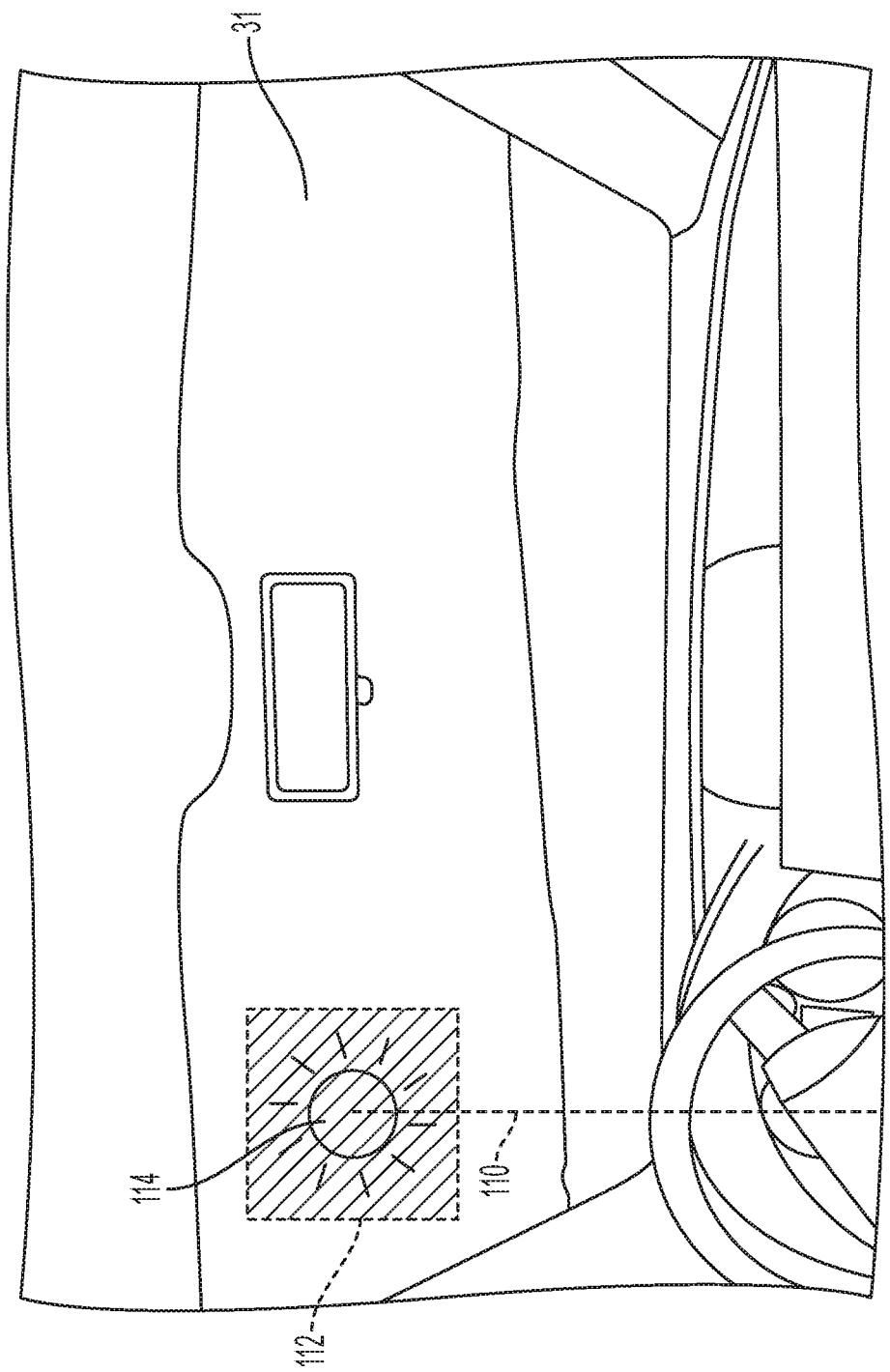
FIG. 5 depicts an application of another exemplary aspect of the process of FIG. 2 in accordance with one or more exemplary embodiments.

In step 240, with additional reference to FIG. 5, processor 36 will identify a point of gaze (POG) position along the surface of the OLED window 31 that corresponds to the vehicle occupant's facial features (e.g., their retinas). For example, processor 36 will calculate the exact location along the pane of the OLED window 31 in which the vehicle occupant's point of gaze 110 is directed. In order to calculate this exact location, moreover, processor 36 may map out the window pane of OLED window 31 and/or use heat maps (i.e., to quickly visualize which window pane surface locations attract the most attention), areas of interest (AOI) techniques, Time to First Fixation (TTFF) techniques, or any other generally known methodologies that can be used to determine a POG position.

In step 250, processor 36 will activate OLED window 31 to generate a dim spot 112 at the POG position on the window pane. This dim spot 112 is a spot dimming (tinting) feature that is generally a black/gray translucent image generated by the OLED screen of OLED window 31 and which covers a light distractor (e.g., the sun) at and around the vehicle occupant's point of gaze 110. As follows, the dim spot 112 will block out a percentage of the light distractor's light from passing through that portion of the OLED window 31 and thus create a shadow that covers at least a portion of the vehicle occupant's face. In addition, the dim spot 112 will protect the vehicle occupant 108 from being distracted or temporarily blinded by the light distractor 114 (e.g., the sun). Dim spot 112 may also be large enough to block out a reasonably sized light distractor 114 (e.g., 8" long by 6" wide) and may be varied by vehicle occupant feedback (e.g., via display 50). As shown, the dim spot 112 has a circular cross section but can have cross sections of other shapes (e.g., square, ovular, rectangular, etc.).

It has also been contemplated that the dim spot 112 can be produced at a location on the surface of OLED window 31 that is relative to the POG position. For example, processor 36 can use a camera installed somewhere on the body of vehicle 12 (e.g., mirror mounting module) and object tracking software to track the location of a light distractor 114 in relation to vehicle 12. Moreover, processor 36 can use known mathematic equations to determine a location along the surface of OLED window 31 that is in relation to the POG positions such that the dim spot 112 will overlay the light distractor 114 no matter where the vehicle occupant moves their point of gaze 110. As follows, as one example, processor 36 can calculate a location on the surface of the OLED window 31 that corresponds to the location of a light distractor 114 in relation to vehicle 12. The processor 36 can then compare this light distractor location in relation to the POG position on the window pane and then determine where along the surface of the OLED window 31 light from the light distractor 114 would be shined into the eyes of the vehicle occupant and, in turn, produce this dim spot 112 at this location. Skilled artists will see there are other mathematical methodologies to produce the dim spot 112 at a location that will overlay the light distractor 114.

Figure 6:
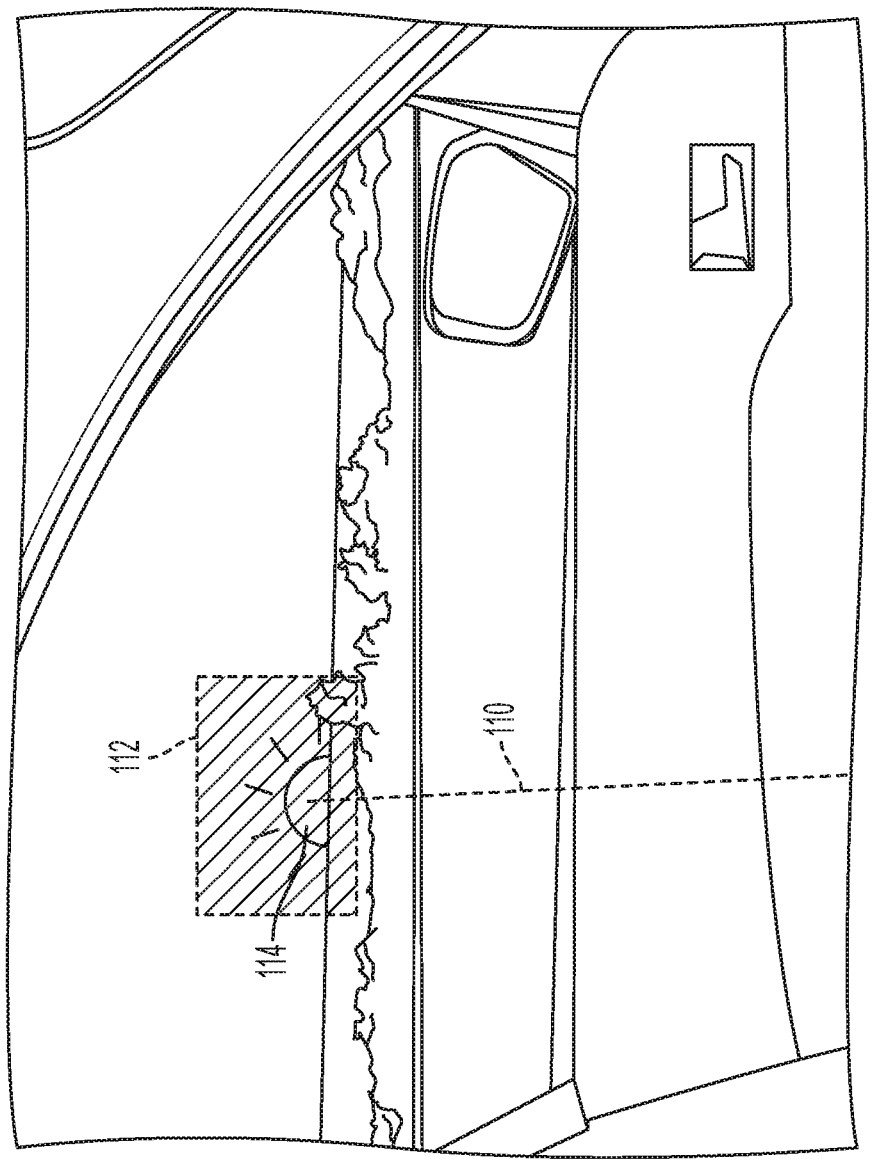
FIG. 6 depicts an application of another exemplary aspect of the process of FIG. 2 in accordance with one or more exemplary embodiments.

In certain embodiments, the dim spot 112 can be used for mood lighting. For example, the dim spot 112 can be of a select color (e.g., yellow, blue, red, etc.). As follows, as ambient light/daylight passes through the dim spot 112, the dim spot 112 would emanate the selected color in the vehicle cabin (i.e., the daylight would be refracted by the dim spot 112 and thus cause the vehicle interior to light up with the color of the dim spot 112). As shown in FIG. 6, the OLED window 31 may be a vehicle window other than the windshield (e.g., the driver side/passenger side window, sunroof/moonroof, rear window, etc.). Moreover, processor 36 can activate this embodiment of the OLED window 31 to generate the dim spot 112 at a corresponding POG position on this window pane.

In step 260, processor 36 will continue to cause camera 37 to capture real-time video footage of the vehicle occupant's head and facial features and provide this video footage to processor 36. Moreover, in this step, processor 36 will review the video footage and deploy facial recognition software and/or retina tracking software to calculate the vehicle occupant's point of gaze. In step 270, processor 36 will determine if the vehicle occupant adjusts their point of gaze. Moreover, if the vehicle occupant does adjust their gaze, method 200 will move to step 280. If the vehicle occupant does not adjust their point of gaze, however, the processor 36 will return to reviewing the video footage and calculating the vehicle occupant's point of gaze.

In step 280, processor 36 will deploy known methodologies to identify a POG position along the surface of the OLED window 31 that corresponds to this new, subsequent orientation of vehicle occupant's facial features. In step 290, processor 36 will cause OLED window 31 to generate a dim spot 112 at the new, vehicle occupant adjusted POG position on the window pane. After step 280, method 200 will return to reviewing the video footage and calculating the vehicle occupant's point of gaze.

Figure 7:
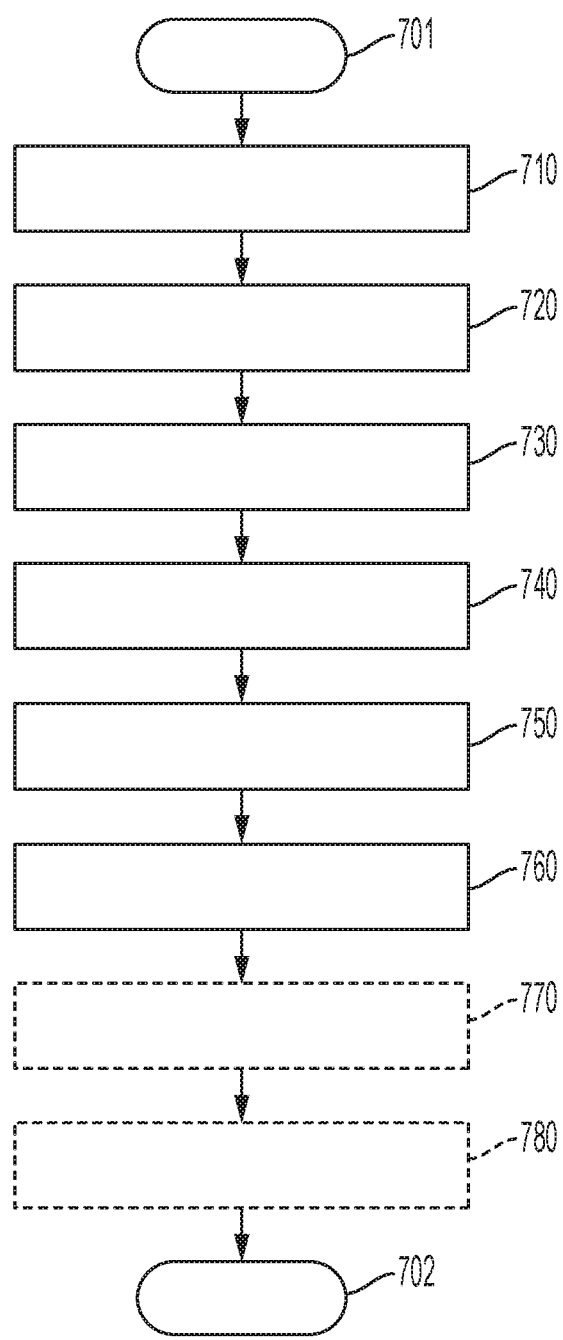
FIG. 7 is a flowchart of an exemplary process to adjust aspects of a dim spot on a vehicle window.

Now turning to FIG. 7, there is shown an embodiment of a method 700 to adjust a visible light transmission (VLT) level for the dim spot 112. One or more aspects of VLT adjustment method 700 may be completed through vehicle telematics unit 30 which may include one or more executable instructions incorporated into memory device 38 and carried out by processor 36. One or more ancillary aspects of method 700 may otherwise, for example, be completed through display 50, OLED window 31, mobile computing device 57, and remote facility 80 (including regulatory information incorporated into databases 84 and provided by server 82).

Method begins at 701 in which a dim spot 112 has been produced by OLED window 31 (see method 200, above). In step 710, the vehicle occupant will set their preferred level of tint for the dim spot 112 through the display 50 (which may be, but is not limited, to the infotainment touch screen or the diver information center panel). In an alternative embodiment, the vehicle occupant will set their preferred level of tint for the dim spot 112 through their mobile computing device 57, for example, via the vehicle app 61. In step 720, in response to the vehicle occupant's input, processor 36 will adjust the VLT level of the dim spot 112. For example, processor 36 may adjust the VLT level from 100% to 80%. Adjusting the dim spot 112 ensures that the vehicle occupant can modify the dim spot to meet their desires and not be distracted or temporarily blinded by a light distractor in their view.

In step 730, processor 36 may receive regulatory information from remote facility 80 over wireless carrier service 70. This regulatory information, for example, will include the minimum allowable VLT percentages for multiple jurisdictions. For example, the regulatory information could reflect that New Mexico allows a minimum VLT level of 60%, Vermont allows a minimum VLT level of 80%, and Michigan allows a minimum VLT level of 70%. In step 740, processor 36 will retrieve the vehicle location by implementing the GNSS receiver 22. In step 750, processor 36 will cross check the vehicle location against the regulatory information and pull the minimum VLT level for the jurisdiction (e.g., Michigan) vehicle 12 is currently located. In step 760, processor 36 will establish a floor that the VLT level can be adjusted by the vehicle occupant. Thus, if the minimum VLT level is established as 70%, the vehicle occupant cannot adjust the VLT level of the dim spot 112 below 70%. In optional step 770, the vehicle operator changes the color of the dim spot 112 (discussed above) via the display 50 or mobile computing device 57. In optional step 780, processor 36 will adjust the color of the dim spot 112 in response to the vehicle operator's color-change input. After step 780, method 700 moves to completion 702.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to tint at least a portion of a vehicle window, the system comprising:
    a memory configured to comprise one or more executable instructions and a processor configured to execute the executable instructions, wherein the executable instructions enable the processor to:
    monitor an amount of ambient light in a surrounding vehicle environment;
    compare the monitored amount of ambient light to a threshold value;
    when the monitored amount of ambient light exceeds the threshold value, dim at least a portion of an OLED window located at a vehicle; and
    receive regulatory information from a remote database, wherein the regulatory information is related to minimum allowable VLT levels designated for a plurality of jurisdictional areas;
    receive a vehicle location;
    compare the vehicle location to the regulatory information to determine the minimum allowable VLT level for the vehicle location;
    establish the minimum VLT level for the OLED window; and
    wherein the OLED window cannot be dimmably adjusted to exceed the minimum VLT level.

2. The system of claim 1, wherein the executable instructions further enable the processor to:
    in response to feedback provided by a vehicle occupant, adjust a visible light transmission (VLT) level of the dimmed OLED window from a first VLT level to a second VLT level, wherein both the first VLT level and second VLT level correspond to actively inhibiting light distractors from being able to distract and/or temporarily blind a vehicle occupant, and wherein both the first VLT level and second VLT level block out a percentage of the light from the light distractor from passing through the OLED window.

3. The system of claim 1, wherein the executable instructions further enable the processor to:
    in response to feedback provided by a vehicle occupant, adjust a color of the dimmed OLED window such that, as ambient light passes through the dimmed OLED window, an interior of the vehicle will illuminate with the color of the dimmed OLED window.

4. The system of claim 1, wherein the vehicle window is a windshield.

5. The system of claim 1, wherein the ambient light is monitored via a light sensor located at the vehicle.

6. A system to tint at least a portion of a vehicle window, the system comprising:
    a memory configured to comprise one or more executable instructions and a processor configured to execute the executable instructions, wherein the executable instructions enable the processor to:
    monitor an amount of ambient light in a surrounding vehicle environment via a light sensor located on a vehicle;
    compare the monitored amount of ambient light to a threshold value;
    when the monitored amount of ambient light exceeds the threshold value, monitor one or more facial features of a vehicle occupant via a camera located on a steering column of the vehicle;
    based on an orientation of the one or more facial features, identify a point of gaze (POG) position along a surface of an organic light-emitting diode (OLED) window that corresponds to the orientation of the one or more facial features;
    generate a dim spot relative to the POG position via the OLED window; and
    in response to feedback provided by the vehicle occupant, adjust a visible light transmission (VLT) level of the dim spot from a first VLT level to a second VLT level, wherein both the first VLT level and second VLT level correspond to actively inhibiting light distractors from being able to distract and/or temporarily blind a vehicle occupant, and wherein both the first VLT level and second VLT level block out a percentage of the light from the light distractor from passing through the dim spot.

7. The system of claim 6, wherein the vehicle occupant feedback is provided by a mobile computing device.

8. The system of claim 6, wherein the vehicle occupant feedback is provided by a touch screen display.

9. The system of claim 6, wherein the executable instructions further enable the processor to:
    receive regulatory information from a remote database, wherein the regulatory information is related to minimum allowable VLT levels designated for a plurality of jurisdictional areas;
    receive a vehicle location;
    compare the vehicle location to the regulatory information to determine the minimum allowable VLT level for the vehicle location;
    establish the minimum VLT level for the dim spot; and
    wherein the VLT of the dim spot cannot be adjusted to exceed the minimum VLT level.

10. The system of claim 6, wherein the executable instructions further enable the processor to:
  in response to feedback provided by the vehicle occupant, adjust a color of the dim spot such that, as ambient light passes through the dim spot, an interior of the vehicle will illuminate with the color of the dim spot.

11. The system of claim 6, wherein the vehicle window is a windshield.

12. A vehicle comprising:
  an organic light-emitting diode (OLED) window;
  a light sensor installed on a vehicle;
  a steering column comprising a camera;
  a cabin configured to hold at a vehicle occupant;
  a memory configured to comprise one or more executable instructions and a processor configured to execute the executable instructions, wherein the executable instructions enable the processor to:
    monitor an amount of ambient light in a surrounding vehicle environment via the light sensor;
    compare the monitored amount of ambient light to a threshold value;
    when the monitored amount of ambient light exceeds the threshold value, monitor one or more facial features of a vehicle occupant via the camera;
    based on an orientation of the one or more facial features, identify a point of gaze (POG) position along a surface of the OLED window that corresponds to the orientation of the one or more facial features;
    generate a dim spot relative to the POG position via the OLED window; and
    in response to feedback provided by the vehicle occupant, adjust a visible light transmission (VLT) level of the dim spot from a first VLT level to a second VLT level, wherein both the first VLT level and second VLT level correspond to actively inhibiting light distractors from being able to distract and/or temporarily blind a vehicle occupant, and wherein both the first VLT level and second VLT level block out a percentage of the light from the light distractor from passing through the dim spot.

13. The vehicle of claim 12, wherein the executable instructions further enable the processor to:
  when an orientation of the one or more facial features is adjusted, adjust the POG position along the surface of the OLED window so as to correspond to the subsequent orientation of the one or more facial features; and
  provide the dim spot relative to the adjusted POG position via the OLED window.

14. The vehicle of claim 12, wherein the vehicle occupant feedback is provided by a mobile computing device.

15. The vehicle of claim 12, wherein the vehicle occupant feedback is provided by a touch screen display.

16. The vehicle of claim 12, wherein the executable instructions further enable the processor to:
  receive regulatory information from a remote database, wherein the regulatory information is related to minimum allowable VLT levels designated for a plurality of jurisdictional areas;
  receive a vehicle location;
  compare the vehicle location to the regulatory information to determine the minimum allowable VLT level for the vehicle location;
  establish the minimum VLT level for the dim spot; and
  wherein the VLT of the dim spot cannot be adjusted to exceed the minimum VLT level.

17. The vehicle of claim 12, wherein the executable instructions further enable the processor to:
  in response to feedback provided by the vehicle occupant, adjust a color of the dim spot such that, as ambient light passes through the dim spot, an interior of the vehicle will illuminate with the color of the dim spot.

* * * * *